April 26, 1960 V. V. TIIKKAINEN 2,934,591
SAFETY COVER FOR ELECTRICAL OUTLET FIXTURE
Filed July 22, 1957 2 Sheets-Sheet 2
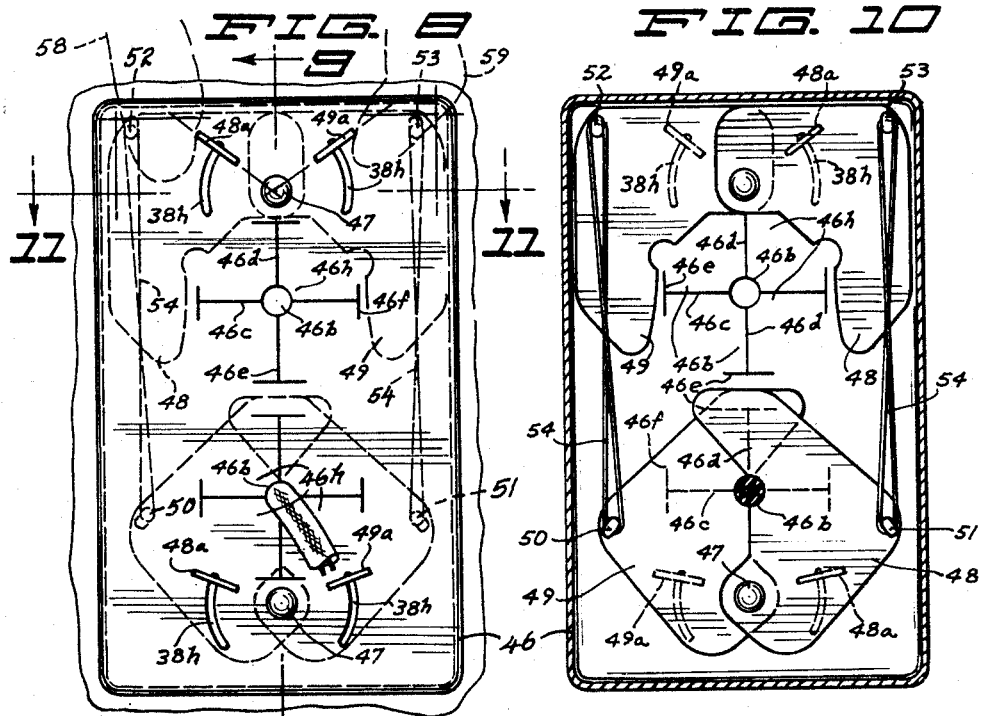
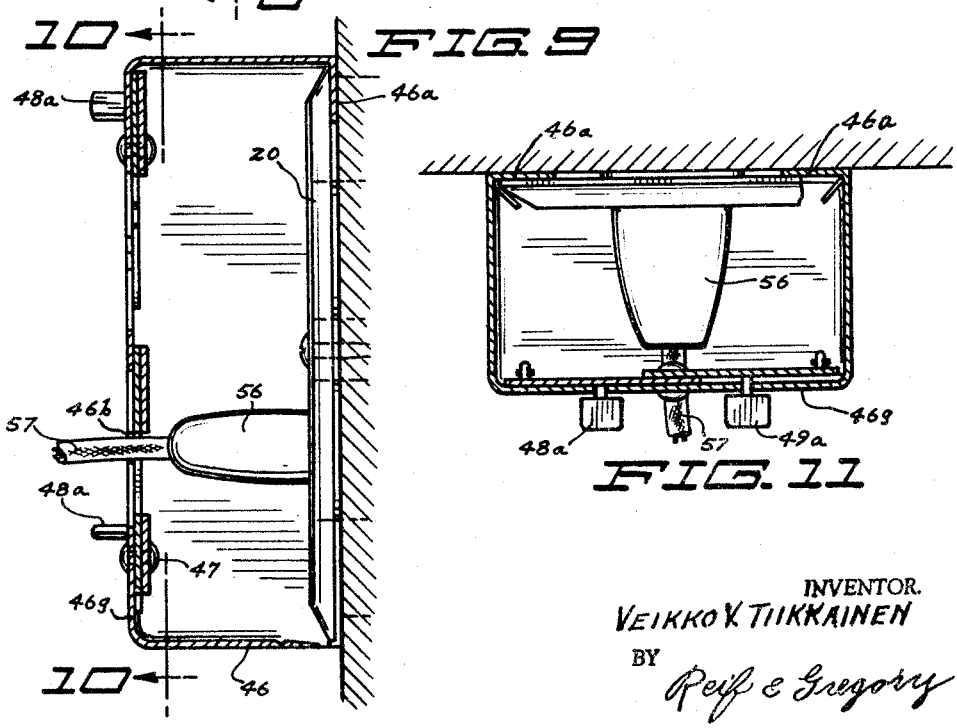
INVENTOR.
VEIKKO V. TIIKKAINEN
BY
Reif & Gregory
ATTORNEYS United States Patent Office 2,934,591
Patented Apr. 26, 1960

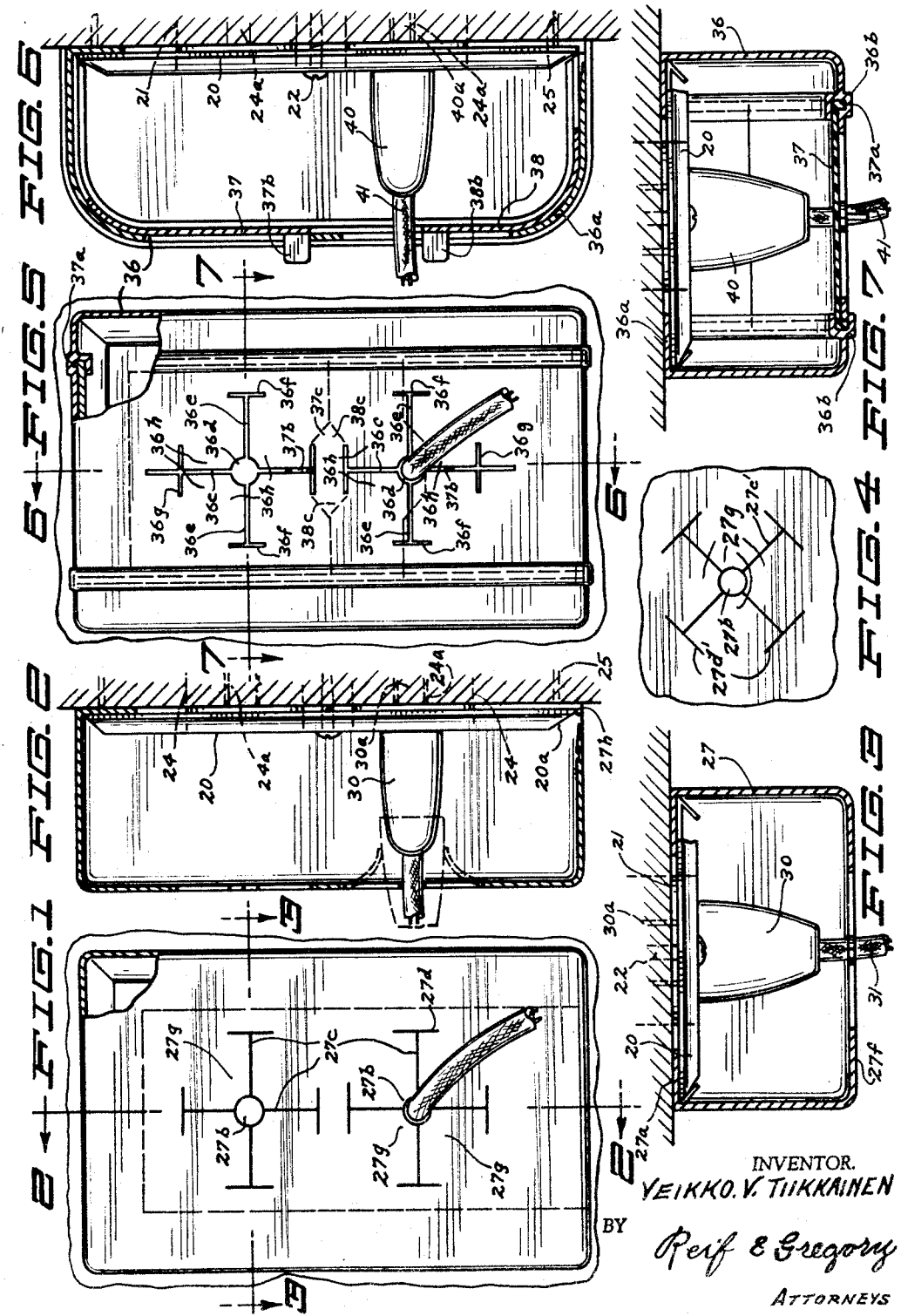

2,934,591

SAFETY COVER FOR ELECTRICAL OUTLET FIXTURE

Veikko V. Tiikkainen, Minneapolis, Minn.

Application July 22, 1957, Serial No. 673,277

3 Claims. (Cl. 174—67)

This invention relates to a safety cover for an electrical outlet fixture, such as now commonly used in walls and floors, and within easy reach of small children. As is well known, a plug on an electric cord can be pushed into such fixtures and withdrawn therefrom and that a plug only partly withdrawn can present exposed electrified prongs or electrodes. Small children have a tendency to pull on such electrical cords and pull the plug out of the fixture and to insert articles such as hairpins into the slots of the fixture electrifying such articles. Protection is needed for such fixtures to prevent persons from being shocked should the plug or fixture be defective or an article be inserted in the fixture and charged parts thus be exposed to human touch.

It is an object of this invention to provide a simple and efficient protective device for covering the outlet fixture and which can be readily and securely attached to the fixture and yet readily removed therefrom, but which need not be removed in order that a plug be inserted into or withdrawn from the fixture.

It is a further object of the invention to provide a casing having a rear open side and having means to attach said casing to the front flat covering plate which forms a part of the fixture.

It is another object of the invention to provide a safety covering for an electrical outlet fixture comprising a box-like casing readily attachable to said fixture and detachable therefrom, said casing having a front side having an aperture therethrough for the passage of an electrical cord connected to a plug and also having means about said aperture which can be pressed inwardly by said plug so that said plug can be moved into said casing and connected to said fixture.

It is also an object of this invention to provide such a device as set forth in the preceding paragraph in which said means comprises separate movable portions formed by intersecting slits made in said front portion.

It is further an object of this invention to provide a safety cover for an electrical outlet fixture comprising a box-like casing having means for attachment to said fixture and having a front portion through which a plug and cord attached thereto may be passed, together with one or more doors which can be moved over said last mentioned portion so that said plug cannot be withdrawn through the front portion of said casing.

It is more specifically an object of this invention to provide a safety cover for an electrical outlet fixture comprising a box-like casing which can be readily attached to said fixture, said casing having a front side having an aperture through which an electrical cord connected to an electric plug may pass, and means about said aperture past which said plug may be moved, together with a pair of doors at the inner side of said front portion which may be moved to cover said aperture and means, and which may be moved to uncover said aperture and means.

These and other objects and advantages of the invention will be fully set forth in the following description made in connection with the accompanying drawings in which like reference characters refer to similar parts throughout the several views and in which:

Fig. 1 is a front view in elevation of the device of this invention;

Fig. 2 is a vertical section taken on line 2—2 of Fig. 1, as indicated by the arrows;

Fig. 3 is a horizontal section taken on line 3—3 of Fig. 1, as indicated by the arrows;

Fig. 4 is a partial view in front elevation showing a modification;

Fig. 5 is a view in front elevation of a modification, some parts being broken away and others shown in vertical section;

Fig. 6 is a vertical section taken on line 6—6 of Fig. 5, as indicated by the arrows;

Fig. 7 is a horizontal section taken on line 7—7 of Fig. 5, as indicated by the arrows;

Fig. 8 is a view in front elevation of a further modification;

Fig. 9 is a vertical section taken on line 9—9 of Fig. 8, as indicated by the arrows;

Fig. 10 is a vertical section taken on line 10—10 of Fig. 9; and

Fig. 11 is a horizontal section taken on line 11—11 of Fig. 8.

Referring to the drawings, particularly Figs. 1 to 3, an electrical outlet fixture is indicated of which it will only be necessary to refer to the plate 20 which is attached to the wall 21, preferably by the screw 22. Plate 20 is shown as having a surrounding flange 20a which extends outwardly at its edges. Said fixture will also comprise an outlet 24 having spaced slots 24a therein for the reception of the electrodes on a common electrical plug. The outlet indicated is a commonly used double outlet. Said outlet 24 is usually disposed in an outlet box 25.

In accordance with the present invention, a cover is provided comprising a casing 27, and while this casing might be of various shapes, in the embodiment of the invention it is shown as a box-like casing rectangular in vertical and horizontal sections. Said casing will be made of a non-electrically conductive material. Casing 27 has an open inner side having at its side portions, flanges 27a. Said casing 27 has a lip portion 27h extending inwardly at the bottom of flanges 27 to engage the bottom edge of said plate 20. Plate 20 can be separated slightly from the wall 21 by loosening screw 22 and the flanges 27a can then be moved vertically with casing 27 so that they are in the rear of plate 20. Screw 22 can then be again tightened. Casing 27 has a flat front side provided with one or more apertures 27b, two of these being shown. Slits 27c extend at right angles to each other outwardly from the apertures 27b. Slits 27d extend at right angles to the ends of slits 27c, the slits 27c bisecting the slits 27d. The front portion 27f is of resilient material and the slits 27c and 27d form separate portions 27g. The portions 27g are quite flexible and resilient and an electric plug 30 having the usual electrodes 30a can be pushed against the portions 27g and move them rearwardly so that said plug can pass said portions and be connected to the outlet 24. When flexed the portions 27g return to normal position. The cord 31 attached to plug 30 will pass through portion 27f through aperture 27b.

With the form of the invention shown in Figs. 1 to 3, with the device attached to plate 20, when it is desired to connect the plug to the fixture, said plug will merely be pressed against portions 27g first with the electrodes 30a and then with the body of the plug. Portions 27g will be moved inwardly as indicated in Fig. 2, so that said plug can pass the same and be connected to the receiving outlet 24. When plug 30 is to be removed, it will only be necessary to pull upon the cord 31 and said plug will move outwardly past portions 27g, said portions being moved outwardly by the plug.

A slight modification of casing 27 is shown in Fig. 4 having slits 27c' and 27d' positioned at angles somewhat differently to said casing 27 than said slits 27c and 27d.

Referring to Figs. 5, 6 and 7, a modification is shown comprising a casing 36 which is illustrated as also substantially rectangular in vertical and horizontal cross section. The end corner portions of casing 36 are each formed on quite a curve 36a, as shown in Fig. 6. Plate 20 is shown and screw 22, which are the same as in Figs. 1 to 3, which also is true of the wall 21 and the outlet 24 therein, as well as outlet box 25. Casing 36 is provided with a flange 36a, similar to flange 27a of casing 27. This can be disposed in the rear of plate 20, as above described in connection with flange 27a. Casing 36 has an open portion at its front provided at its edges with channel members 36b. Lower and upper flexible plate-like members 37 and 38 have outwardly projecting flanges 37a and 38a disposed in the channels of portions 36b. The front side of casing 36 has formed therein vertical slots 36c in which are movable handle members 37b and 38b respectively which are connected to the members 37 and 38 respectively. Members 37 and 38 have respectively recesses 37c and 38c in their adjacent edges. The front portion of casing 36 also has apertures 36d therein illustrated as circular. Horizontal slots 36e extend outwardly from openings 36d and have at their outer ends vertical slots 36f extending at right angles thereto, slots 36f being bisected by slots 36e. Horizontal slots 36g extend transversely of slots 36c. Slots 36g are bisected by slots 36c. It will be seen that slots 36c and 36e form four separate portions 36h.

In operation, with the casing 36 attached to plate 20, when it is desired to connect a plug to the outlet 24, such as plug 40, said plug will be pushed against portions 36h first with its electrodes 40a, and then with the body of the plug, and portions 36h will be moved rearwardly so that the plug can pass the same and be inserted in the slots 24a in the outlet 24. Only one plug is shown positioned and will be described in operation. At this time the member 38 will be moved in its position most remote from aperture 36d, the lower with reference to Figs. 5 and 6. The plug can then pass the same. When the plug has been inserted in the outlet 24, the members or doors 38 can then be moved by handle 38b, up to the plug to prevent portions 36h from being pressed inwardly. The fixture is now not only protected by the portions 36h but is also protected by the sliding flexible doors 37 and 38. The door 37 will be moved downwardly to cover the upper flexible portions 36h. When it is desired to remove the plug, the handle 38b can be moved towards the lower end of casing 36 and aperture 36d and portions 36h will be uncovered by said door and the plug can be removed by pulling upon its cord 41. Said cord will move in the aperture 36d and the body portion will press against the inside of portions 36h which will move outwardly and permit the passage of the plug. In the absence of any plugs, said doors 37 and 38 will be moved toward each other to cover the apertures 36d and movable portions 36h as indicated in dotted line in Fig. 5.

Considering Figs. 8, 9, 10 and 11, another modification is shown in which the fixture parts are the same as shown in the figures already described. A casing 46 is provided similar to casing 27, the same being substantially rectangular in horizontal and vertical cross section. Casing 46 has an open inner side and has inwardly projecting side flanges 46a which as previously described can be disposed in the rear of plate 20. The front part of casing 46a is provided with the spaced apertures 46b and with slits 46c, 46d, 46e and 46f. These slits are the same as shown in Fig. 1. It will be seen that the above said slits form four separate portions 46h. Pivot members 47 are provided comprising headed rivets disposed in the front portion 46g. Pivots 47 pass through overlapping portions of swinging doors 48 and 49. These doors are shaped, as shown in Figs. 8 and 10. Doors 48 and 49 are shown in closed or adjacent positions in the lower portions of Figs. 8 and 10, and are shown in open or separated positions in the upper portions of Figs. 8 and 10. Said doors have attached thereto handles 48a and 49a. Handles 48a and 49a have portions passing respectively through oppositely disposed arcuate slots 38h in the front portion 46g of casing 46. Doors 48 and 49, as shown in Figs. 9 and 11, are disposed adjacent the inner side of front portion 46g. Doors 48 and 49 have secured thereto respectively and projecting inwardly therefrom, pins 50 and 51. Cross bands 54 of resilient material, such as rubber, extend respectively about pins 50 and 51 at their lower ends, and at their upper ends extend respectively about pins 52 and 53, said latter pins being in the upper doors while pins 50 and 51 are in the lower doors.

In operation, when it is desired to secure a plug, such as plug 56 having an electric cord 57 secured thereto to the fixture, the operator will press upon handles 48a and 49a and this will swing doors 48 and 49 away from each other about pivot 47. The doors will then be moved to the position shown by the upper doors in Figs. 8 and 10. When the doors are so moved, tension will be placed on the resilient bands 54 which will be extended. Tension will also be placed on the pins 50 and 51 in the lower doors, as shown in Figs. 8 and 10. These doors are however in closed position and will not be moved. The plug 56 can now be pressed against the portions 46h first by its electrodes and then by the body portion of the plug, and portions 46h will be moved rearwardly so that the plug will pass the same and can be inserted in the outlet 24. The pressure on handles 48a and 49a can now be relieved and doors 48 and 49 will be moved to closed position by the elastic bands 54. The operation of both doors is substantially the same and it is believed no separate description of both will be required. When the plug 56 is to be removed, the doors 48 and 49 will again be separated by pressure on the handles 48a and 49a and the cord 57 will be pulled upon and plug 56 will be pulled out of its socket. Said plug will press upon the inner sides of portions 46h and these will be separated and permit passage of the plug. The plug will also pass between the opened doors 48 and 49. A thumb 58 and finger 59 of the operator are shown in dotted line operating the upper doors 48 and 49 in Fig. 8.

From the above description it will be seen that I have provided a simple, novel and very efficient safety cover for an electrical outlet fixture and plug. The device can be easily and quickly attached to a standard outlet fixture and will prevent children and others from coming into contact with exposed electrical contact portions of either a plug or outlet fixture. The device has been amply demonstrated in actual practice and found to be very successful and efficient.

It will of course be understood that various changes may be made in the form, details, arrangement and proportions of the parts, without departing from the scope of applicant's invention, which, generally stated, consists in a device capable of carrying out the objects above set forth, in the parts and combinations of parts disclosed and defined in the appended claims.

What is claimed is:

1. A safety cover for an electrical outlet fixture, said outlet fixture comprising a plate attached to a support in a wall and having a member with slots for receiving electrodes of an electric plug having in combination, a box-like casing having a front and depending side portions and an open rear side adapted to receive therein an electrical plug, a pair of right-angled flanges at a pair of opposite sides of said casing at the free ends thereof adapted to be disposed under a pair of opposite sides of said plate, said front side of said casing being formed of a flexible material having a small aperture therein, a plurality of T slits extending radially outwardly of said aperture forming movable flaps adapted normally to spring to return position in the plane of said front side, said casing having a sufficient depth whereby said plug is sufficiently disposed within said casing to have its upper end completely free of the inbent ends of said flaps whereby said flaps are able freely to return to their normal position, and an electrical plug may be completely inserted into said casing.

2. A safety cover for an electrical outlet fixture, said fixture comprising a plate attachable thereto and overlying a wall surface, said fixture having means with slots for receiving the electrodes of an electric plug having in combination, a box-like casing of resilient material having a front side, depending sides thereabout and an open rear side, and having flanges at the free ends of a pair of parallel sides with said flanges being adapted to be removably disposed under said plate, said casing having an aperture through its front side for the passage of electrical wire, spaced pairs of aligned radially extending T slits about said aperture and extending longitudinally and transversely of said front portion forming bendable flap portions past which an electric plug can be completely inserted, transversely spaced arcuate slotted guides in said front portion, a pair of doors pivoted at a point centrally between said guides to cover or uncover the underside of said flap portions, said guides having lugs upstanding therefrom extending through said guides whereby said doors are movable to be pivoted toward or away from one another to cover or uncover the area beneath said flaps.

3. A safety cover for an electrical outlet fixture, said fixture comprising means for receiving electrodes of an electrical plug and having a wall plate secured thereto having in combination, a box-like casing of flexible material having a front surface, depending sides and an open rear side, flanges at the free ends of a pair of parallel sides adapted to be removably disposed under said wall plate, an aperture in said front surface for the passage of an electrical cord therethrough, pairs of radially extending aligned T slits about said aperture, said pairs of slits respectively extending in directions at right angles to one another, said slits forming flap portions therebetween bendable for the passage of an electrical plug thereby, a pivot centrally between said slits having its axis normal to the plane of said front side, a pair of plate-like doors respectively adapted to be pivoted at one end to said pivot and being swingable about the axis of said pivot and being adapted to mate along adjacent edge portions to cover the area embracing said slits to prevent the passage of an electrical plug through said flap portions, and a handle on each of said doors respectively extending through said slots for swinging said doors in a plane parallel to the plane of said front side to separate the same to permit the insertion or withdrawal of an electrical plug into or from said casing, an upstanding pin on each of said doors at points remote from their respective pivot points, and elastic means in said casing connected to said pins for automatically moving said doors together to close the area beneath said flaps to prevent the removal of said plug.

References Cited in the file of this patent

UNITED STATES PATENTS

| | | |
|---|---|---|
| 900,773 | Patterson | Oct. 13, 1908 |
| 944,605 | Fisher | Dec. 28, 1909 |
| 2,099,117 | Kelsey | Nov. 16, 1937 |
| 2,239,653 | O'Brien | Apr. 22, 1941 |
| 2,319,145 | Loomis | May 11, 1943 |
| 2,510,745 | Kilgore | June 6, 1950 |
| 2,744,243 | Menendez | May 1, 1956 |
| 2,816,680 | Niemeyer | Dec. 17, 1957 |

FOREIGN PATENTS

| | | |
|---|---|---|
| 406,511 | Great Britain | Mar. 1, 1934 |
| 615,013 | Great Britain | Dec. 31, 1948 |